(12) United States Patent
Blaudszun

(10) Patent No.: US 6,187,099 B1
(45) Date of Patent: Feb. 13, 2001

(54) INSTALLATION FOR THE TREATMENT OF OBJECTS IN A DEFINED GAS ATMOSPHERE, WHOSE $O_2$ CONTENT IS SMALLER THAT THAT OF AIR AND WITH WHICH ENVIRONMENTALLY DAMAGING TREATMENT GASES ARE PRODUCED

(75) Inventor: Bernd Blaudszun, Grünendeich (DE)

(73) Assignee: Knaack & Jahn GmbH, Hamburg (DE)

( * ) Notice: Under 35 U.S.C. 154(b), the term of this patent shall be extended for 0 days.

(21) Appl. No.: 09/253,185

(22) Filed: Feb. 19, 1999

(30) Foreign Application Priority Data

Mar. 6, 1998 (DE) ............................................... 198 09 622

(51) Int. Cl.[7] ............................... C23C 14/00; B05D 3/00
(52) U.S. Cl. ........................ 118/708; 118/400; 118/603; 118/610; 118/719; 134/60; 134/104.2; 134/110
(58) Field of Search ................................... 118/708, 719, 118/400, 620, 603, 610; 134/60, 104.2, 110

(56) References Cited

U.S. PATENT DOCUMENTS

| 2,270,642 | * | 1/1942 | Somes | 134/60 |
| 4,474,199 | * | 10/1984 | Blaudszun | 134/1 |

* cited by examiner

*Primary Examiner*—Richard Bueker
(74) *Attorney, Agent, or Firm*—Vidas, Arrett & Steinkraus, P.A.

(57) ABSTRACT

An installation for the treatment of objects in a defined gas atmosphere whose oxygen content is smaller than that of air and with which environmentally damaging treatment gases are produced with a housing with an entry opening and with an exit opening for the objects passing through, conveyed through the housing, with a first treatment zone in the housing, which comprises the entry opening and which produces the treatment gas for the production of a process gas atmosphere, with a second treatment zone which is connected to the exit opening and which is connected to the first treatment zone via a passage opening for the objects and in which the atmosphere is lean of treatment gas and oxygen, with a circulation for the process gas with which a ventilator suctions process gas from the first treatment zone and sends it via a filter device which holds back the treatment gas, with a first sluice which is allocated to the entry opening and which is flowed upon by the purified process gas coming from the filter device, with a second sluice in the second treatment zone, which is allocated to the passage opening and which likewise is flowed upon by purified process gas, with a third sluice which is allocated to the exit opening and which is connected to a source for inert gas under pressure and with an outgoing air branch for process gas, which in the conveying direction of the objects lies in front of the process air supply, connected to the first sluice.

16 Claims, 2 Drawing Sheets

INSTALLATION FOR THE TREATMENT OF OBJECTS IN A DEFINED GAS ATMOSPHERE, WHOSE O₂ CONTENT IS SMALLER THAT THAT OF AIR AND WITH WHICH ENVIRONMENTALLY DAMAGING TREATMENT GASES ARE PRODUCED

BACKGROUND OF THE INVENTION

The invention relates to an installation for the treatment of objects in a defined gas atmosphere.

In many production procedures for the manufacture, refining and quality improvement, substances are applied which for the improved handling are enriched with solvents. During the production these part substances evaporate and as a rule are led to the production outgoing air.

On account of existing technical regulations outgoing air purification systems must be applied in order to filter production substances which are damaging to the environment. It is known for this to use incineration installations and adsorption and absorption installations.

The occurring outgoing air volume flows are normally dependent on the intensity of the applied solvent. For safety reasons the outgoing air volume flows are considerably higher than is required caused by production. This means in each individual case an uneconomically high volume of the installation for the purification of the outgoing air. For example with the application of combustible solvents the minimum outgoing air quantity is to be selected such that during the continuing production and in particular at the start or stop of the installation under no circumstances may a mixture capable of ignition occur. This is achieved in that the outgoing air quantity is increased in such a manner that no concentrations capable of ignition may occur in the outgoing air. According to safety regulations the distance to the ignitable concentration of flammable substances in production installations is maximally 20% below the limit of inflammability. This means generally that for safety reasons at least five times the outgoing air volume is needed in order to be able to securely operate a production installation. Furthermore the high quantity of outgoing air also after its purification is contaminated with residual substances from the production.

On the basis of a substance of material class III, according to TA-Luft (Official Standard for Clean Air) then a maximum concentration of 150 mg/Nm³ is permitted after outgoing air purification. With a quantity of outgoing air of e.g. 100,000 Nm³/h this would mean an immission of 15 kg/h which would be given to the environment.

It is known to subject certain objects to a surface treatment method, for example with suitable plastics, which for curing the coating, use UV-energy or the electron beam method. With such cases the product quality may be increased by reducing the oxygen concentration in the irradiation region. Since in the irradiation region there is a danger of ignition in any case, the concentration of oxygen is to be limited to a maximum value. An example of such a surface treatment is the coating of glass containers with a polymer.

BRIEF SUMMARY OF THE INVENTION

It is the object of the invention to provide an installation for the treatment of objects in a defined gas atmosphere, whose O₂ content is smaller than that of air and with which environmentally damaging treatment gases are produced, which ensures a secure production operation, causes only slight environmental damage and may be operated economically.

This Object is Achieved by the Invention Disclosed Herein.

With the installation according to the invention there is provided an almost completely closed housing which is only connected to the environment via at least two openings, wherein the objects get into the housing via one opening and go out of the housing via another. With closed containers (reactors) or with installations operating with the batch procedure it is possible to produce a volume of gas sealed from the environment and to set it to a desired concentration of any gaseous components. With objects on the other hand which continuously travel through the housing in a conveyed manner there is present a constant connection to the environment. Since however according to requirements the oxygen concentration must not exceed a maximum value, corresponding measures are needed in order to minimise the influence to the surrounding atmosphere. The housing in the inside is subdivided into at least two zones of which the one is connected to the entry opening and the other to the exit opening. In the first treatment zone the process gas is formed by a part of the treatment gas which is produced in the first zone, for example for coating or vaporizing the accommodated objects, for example with a suitable polymer. In this case the treatment gas contains also a component of solvent so that the coating may be effected in the desired manner. The first zone is connected to the second treatment zone via a passage opening. The second zone is furthermore connected to the exit opening. In this zone the drying or the end reaction of the deposited material takes place, for example with the help of a suitable heat source, or an UV irradiation. Alternatively also electron beam treatment may be carried out. It is essential that for the quality improvement and/or for avoiding an ignition in the second treatment zone the oxygen concentration is minimal.

For achieving and maintaining the desired data the installation according to the invention envisages three sluices of which in each case one is allocated to the entry or exit opening and a further to the passage opening. The first and third sluices prevent the entry of normal air into the treatment zones. The second sluice prevents the entry of process air into the second treatment zone. The sluices form "gas curtains"through which the objects run. In the first sluice the gas curtain is formed by purified process air, just as in the second sluice. Since in the second treatment zone there is supplied an inert gas this is effected preferably in that the third sluice is flowed upon by inert gas by which means it is ensured that in the second treatment zone there prevails a largely inert atmosphere. As an inert gas for example nitrogen or carbon dioxide may be applied.

The process gas is suctioned out of the treatment zone and sent via a filter device so that pollutant gas, for example solvent, is removed. The purified process gas may then be fed back into the treatment zones, somewhat, as mentioned, via the first and second sluice. Since by way of the inert gas supply an excess of gases in the housing arises, the installation according to the invention finally envisages an outgoing air branch for process gas which preferably is connected to the first sluice, in the conveying direction, in front of the entry of the purified process gas into the sluice.

With the installation according to the invention the atmosphere required for the production is purified via a purification installation and the thus purified process gas is led to a closed circuit system of the production installation. The outgoing air delivered to the environment is minimal since as a maximum it corresponds to the volume which is supplied in the form of inert gas. By way of the directed encapsulation of the production and a defined guiding of the flow whilst using the mentioned sluices, leakage losses may be kept low and correspond to a fraction of the normally occurring purified outgoing air quantity. The installation according to the invention can be particularly preferably applied where with the guiding circulation combustible and chlorinated substances are used.

On account of the relatively well encapsulated production the inert gas consumption may be kept low. In the production atmosphere ignition processes are not at all possible since there lacks a suitable oxygen concentration. The circulation volume flow may be reduced to that measure which is required for the production without problems arising with regard to safety technology. As is known each volume flow reduction for the production atmosphere reduces the expense, with regard to installation technology, for the purification systems which are integrated into the process circulation.

Since the process gas volume flow is very small also the scope of the filter device may be selected correspondingly small. Preferably as a filter device an adsorber is provided. This as a filter material may preferably use zeolite but also activated carbon, molecular sieves and hydrophilic adsorbents. Instead of a solid bed adsorber also rotors operating with absorbents may be provided.

In many cases it is economical to provide for the recovery of process substances. According to the invention therefore a filter device is part of a purification circuit for the purpose of the recovery of treatment gases or a part thereof, preferably in the fluid form. The purification circuit may for example be a condenser circuit if for example fluid solvents are to be recovered.

If as an inert gas for example nitrogen is used which is retained in the form of liquid nitrogen, which lends itself to the present case, liquid nitrogen may also be used for condenser purposes in that it is conducted over a suitable cooler through which the treatment gas is led. According to one formation of the invention the condenser circuit comprises a first condensate collector as well as a refrigeration circuit which consists of a condensate container with a pump as well as a second cooler cooled with liquid nitrogen and a second collector cooled with condensate coolant. For the improved exploitation of energy the condensate container into which the condensate is led from the condenser circuit is divided up in such a manner that the volume demanded from the pump for feeding the second collector only has a part of the total volume of the condensate container. By way of this the quantity to be cooled is reduced to the absolutely necessary degree.

Preferably two filter units are provided which may be alternately connected to the first treatment zone and the purification device. By way of this, the production process may be continuously operated. If adsorbers are applied after switching over, the particle-laden absorber may be heated to the desorption temperature, which likewise may be effected in a closed circuit. A part flow from the desorption circulation is then led via the condenser circuit. The desorption procedure for the particle-laden filter is carried for so long until the concentration in the filter system corresponds to the saturation charging on exit from the condenser installation. Subsequently the filter by way of cooling is brought to the normal temperature and is thus purified and ready for the next adsorption procedure.

BRIEF DESCRIPTION OF THE DRAWINGS

The invention is hereinafter described in more detail by way of one embodiment example shown in the drawings.

DETAILED DESCRIPTION OF THE INVENTION

Figure 1:
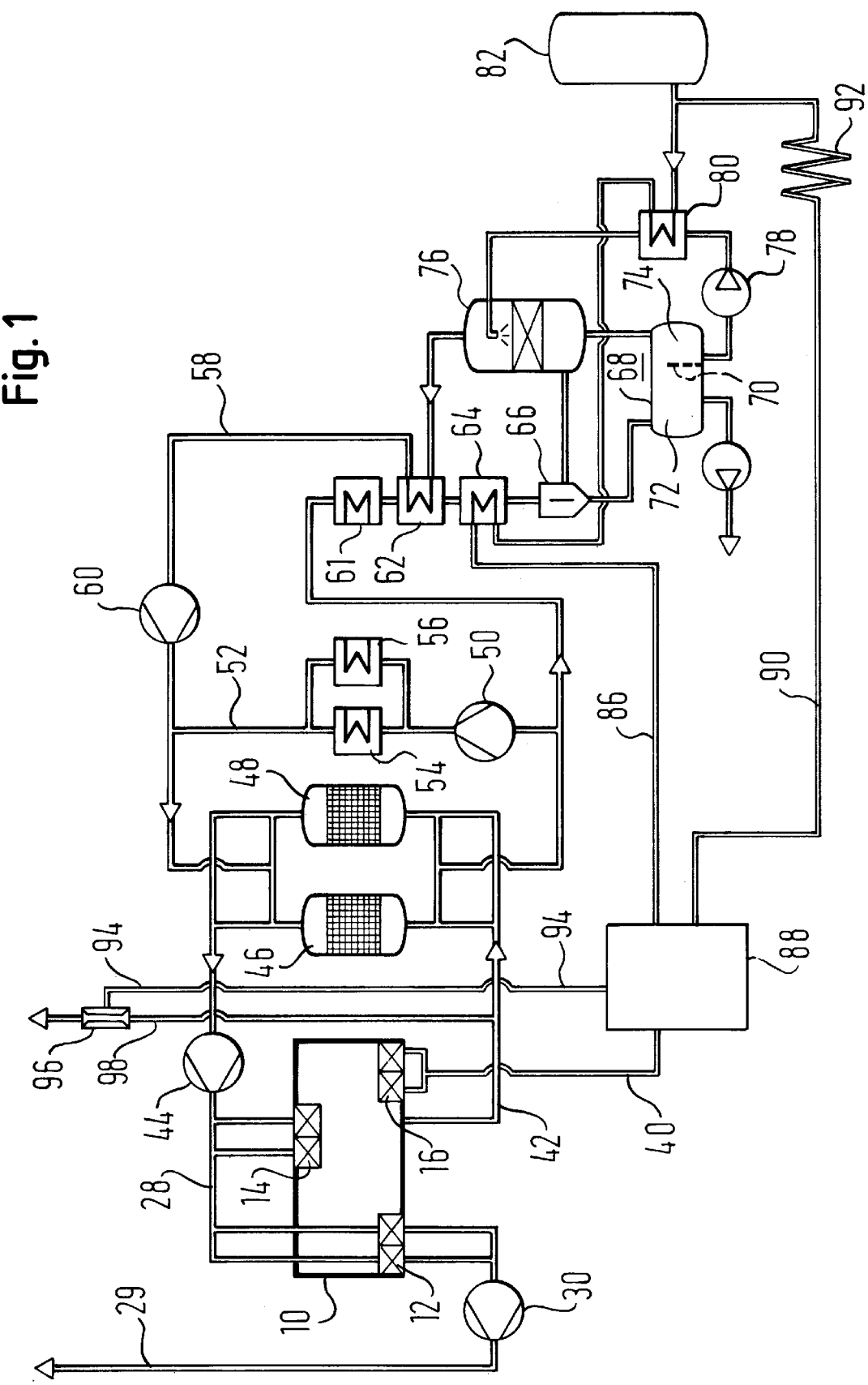
FIG. 1 shows a method illustration of an installation according to the invention.
Figure 2:
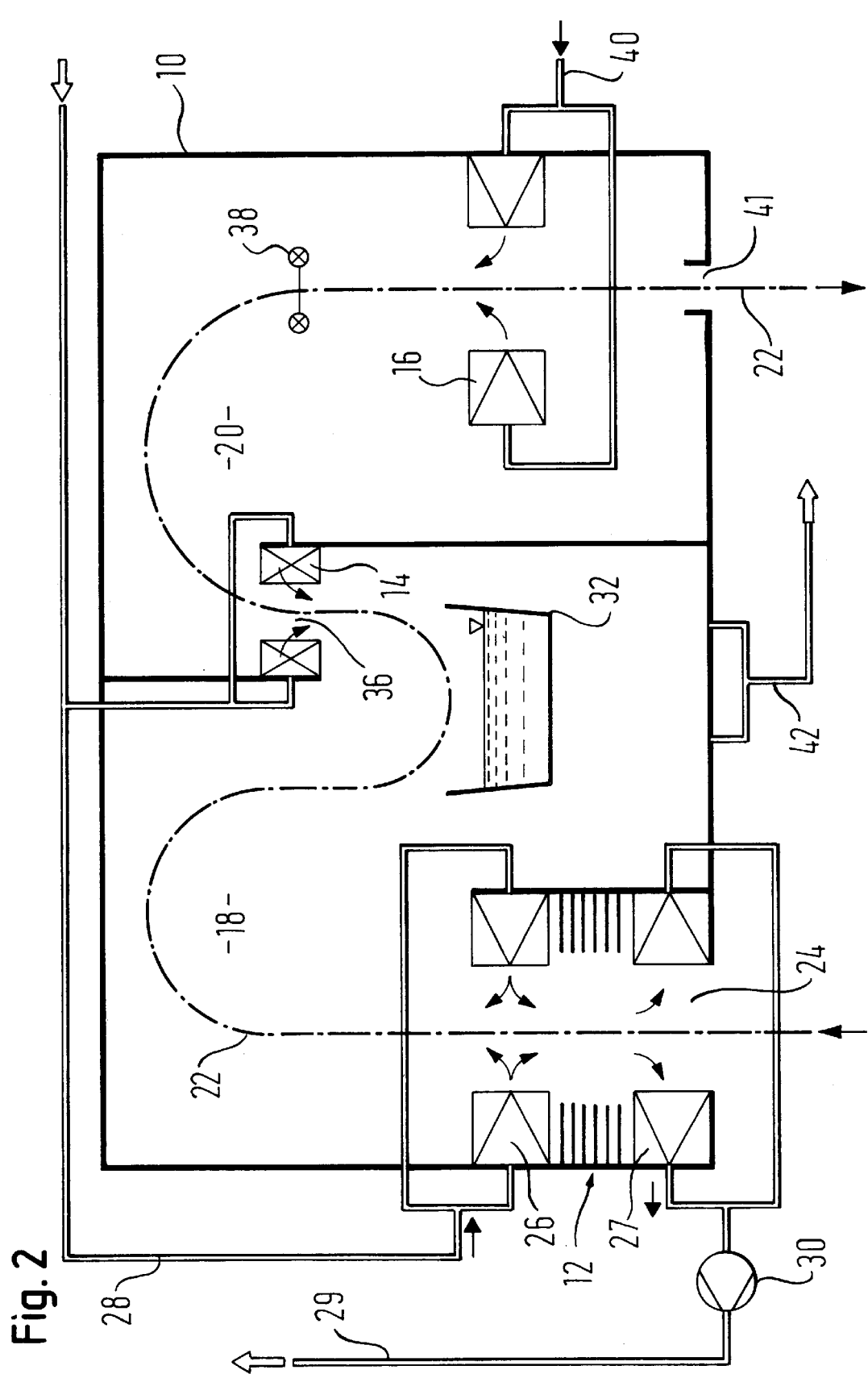
FIG. 2 shows schematically the housing of an installation according to FIG. 1.

The installations or installation parts shown in the FIGS. 1 and 2 serve for example the coating of glass containers with a mixture of polymer and solvent, for example MEK (butanone-2). The coating is effected in a housing 10 which subsequently is gone into in somewhat more detail. In the housing 10 there are arranged three sluices 12, 14 and 16 through which the containers to be coated are guided one after the other, for example with the help of a suitable conveying installation. The housing 10 is also indicated in FIG. 2 and one recognizes that it is divided into a first treatment zone 18 and a second treatment zone 20, through which the containers are successively guided. The path along which the containers move is indicated by the dot-dashed line 22. The sluice 12 to which there is allocated an entry opening 24 for the containers comprises a first section 26 which is connected to a conduit 28 for purified air. With the help of the section 26 in the passage for the objects to be coated there is produced a curtain or a veil of purified process gas which prevents normal air getting into the zone 18 via the entry opening 24. On the particular construction of the sluice 12 no further explanations are made since it is basically known per se.

To the sluice 12 there is further allocated a section 28 via which gas is suctioned off in the region of the entry opening as is indicated by the arrows. This is effected by a blower 30 which emits the suctioned relatively clean process air to the atmosphere.

In the treatment zone 18 there is located a device 32 which carries out the coating, known per se, of the glass container with a suitable polymer, wherein this is aided by a solvent.

In the sluice 14 which likewise is connected to the conduit 28 purified process air is blown into the passage opening 36 for the coated glass container. By way of this it is to be achieved that hardly any process air gets from the zone 18 into the second zone 20 into which the glass containers to be coated get through the sluice 14.

In the second treatment zone 20 the containers are subjected to a UV treatment as is indicated by way of the UV irradiator 38. Subsequently the containers go through the third sluice which is connected to a conduit for nitrogen. The nitrogen causes an atmosphere enriched with the inert gas in the zone 20 so that an ignition of the solvent is ruled out.

To FIG. 2 it is finally yet to be mentioned that the zone 18 is connected to a conduit 42 for particle-laden process gas.

In FIG. 1 it is to be recognized that in the conduit 28 for purified process air there is arranged a ventilator 44 which is in connection with two filter units 46, 48 which for their part are connected to the conduit 42. The described arrangement represents a process gas circuit in that particle-laden process air suctioned from the zone 18 in the filter unit 46 or 48 is purified and subsequently again led back into the housing 10 via the sluices 12 and 14.

The filter units 46, 48 are e.g. adsorbers, wherein zeolite is used as an adsorbant. Inlets and outlets of the filters 46, 48 are connected to one another via a ventilator 50 in a conduit 52, wherein in the conduit 52 there is arranged a parallel arrangement of a heater 54 and a cooler 56. The ventilator 50 and the heater serve the desorption of the adsorber. A part flow is led via a conduit 58 and a further ventilator 60 which contains purified process air. The conduit 58 is led via pre-coolers 60, 62 and a cooler 64 to which a mist collector 66 connects. The mist collector leads the condensate into a condensate container 68 which is subdivided into a larger section 72 and into a smaller section 74 by a weir 70. The process air via a cryo-washer 76 gets back via the precooler 62 to the ventilator 60.

The section 74 of the condensate container 68 is connected to the cryo-washer 76 via a pump 78 and a cooler 80. A liquid nitrogen container 82 is connected to the cooler 80 as well as to the cooler 64 whose output is connected to a control device 88 for nitrogen via a lead 86. The control device 88 is also connected to the nitrogen container 82 via a conduit 90, and specifically via an air evaporator 92. One output of the control device 88 is connected to the conduit 40. A further output is connected to an injector 96 via a conduit 94, and specifically for motive purposes. The injector is in connection with a conduit 98 which for its part is connected to the conduit 42. The injector 96 serves for suctioning particle-laden process air and for transport into the atmosphere.

The Operation of the Shown Installation is as Follows

As already mentioned the oxygen concentration in the second treatment zone 20 for reasons of quality and safety may not exceed a value of 3% by volume. As an inert gas liquid nitrogen from the container 82 is used. The required quantity of nitrogen is made available by the control device 88 from which the sluice 16 is supplied. It is to be understood that suitable sensors are provided in order to monitor the oxygen concentration. Via the conduit 82 the process atmosphere is suctioned and filtered from the first treatment zone, wherein in each case only one filter unit 46 or 48 comes into operation. The adsorbate which is extracted from the treatment zone 18 in gaseous form is agglomerated in the filter unit, and the purified air is supplied again via the ventilator 44. Thus the process circuit is closed.

The excess volume arising by way of adding a certain quantity of nitrogen into the production system is given out to the environment via the described suctioning in the sluice 12. Since the process air which is fed back is purified by the absorbate the exiting concentration of this outgoing air corresponds to the statutory regulations. The quantity of outgoing air is for example 150 m$^3$/h. The process air quantity in the circuit is for example 8000 m$^3$/h. The nitrogen consumption lies for example at 100 m$^3$/h. With conventional methods for safety reasons a minimum process air quantity of 3,000 m$^3$/h is required in order to achieve a concentration of 20% of the lower ignition limit (Maximum Emission Concentration in air). This means for the outgoing air purification, an installation which would at least purify a volume flow of 3,000 m$^3$/h. The immission of the purified air would then be 150 mg/m$^3$. 3,000 m$^3$/h outgoing air, thus 450 gMEK/h. With the described installation a purification installation with the capacity of 800 m$^3$/h is sufficient. With an equal purification capacity of 150 mg/m$^3$ and the defined quantity of outgoing air of 150 m$^3$/h, this would give an immission of 22.5 gMEK/h.

The particle-laden filter unit 48 after switching over is regenerated with heated gas (heater 54) and heated to the desorption temperature. This is effected likewise in a closed circuit.

A part flow from the desorption circulation is then led via the already mentioned condensation installation. Here the dew point of the solvent/nitrogen mixture is fallen short of and condensation occurs. The condensate is collected in the container 68 and may be led again to the production installation. The desorption procedure for the particle-laden filter is carried out for so long until the concentration in the filter system corresponds to the condensation. Subsequently the filter by way of cooling (cooler 56) is brought to a normal temperature and is thus cleaned and ready for the next adsorption procedure.

In the present case liquid nitrogen with a temperature of −96° C. is used for cooling the condensation procedure. Here the condensate on the production process is cooled with liquid nitrogen (cooler 64) to the coolant temperature of the condensation installation and via a specially designed washer (cryo-washer) is used directly for the process air condensation of the part circulation flow from the desorption. For an improved use of energy the part flow in the condensation circuit is cooled from the high temperature level from the desorption by way of the cold process air (cooler 62) after its condensation and the residual cold is exploited from the nitrogen (cooler 64). Additionally a water cooler 60 is connected in front. The nitrogen which evaporates and heats up with this is led via the already described control device 88 to the production installation. As a rule a lower quantity of nitrogen is required for cooling the condensation circuit than for the inert gas supply of the production installation.

Therefore the additional air evaporator 92 is provided which supplements the required nitrogen supply to the control device 88.

The coolant quantity demanded from the pump 78 in the form of the condensate in the container 68 is limited by the section 74 in the container 68. This limiting which is achieved by the overflow weir 70 in the container 68, reduces the amount of solvent to cooled to the absolute necessary.

The condensation circuit is designed such that it is in the position during the desorption procedure to condense the absorbate quantity within the regeneration time.

It is to be understood that the installation is automatically operated. With the onset of oxygen into the production installation via the injector 96 the whole particle-laden production is given out to the environment. Here a transvector system is applied which is operated with nitrogen as a propulsion jet. Additionally an additional quantity of nitrogen (not shown) is supplied to the production in order to reduce the suctioning of surrounding air and not to further accelerate the rise in oxygen. At the same time the treatment procedure is stopped.

With a low requirement of nitrogen below the quantity required for cooling the condensation circuit may be equipped with a commercially available refrigerator.

For optimizing the adsorption process the process air before entry into the filter system may be cooled. For this one may use the cold of the required nitrogen or a conventional cooling.

It is to be understood that the installation according to the invention may also be applied for other cases, for example for coating materials of any type, for impregnating, for cleaning, for reaction processes in the chemical industry, every type of solvent recovery, optimization of existing production processes with regard to energy requirement, safety of installation and environmental protection. Furthermore it may be applied for the outgoing air of production processes in which organic pollutants are present in the outgoing air.

What is claimed is:

1. An installation for the treatment of objects in a defined gas atmosphere whose oxygen content is smaller than that of air and with which environmentally damaging treatment gases are produced, comprising a housing with an entry opening and with an exit opening for the objects passing through, conveyed through the housing a first treatment zone in the housing, which comprises the entry opening and which produces the treatment gas for the production of a process gas atmosphere, with a second treatment zone which is connected to the exit opening and which is connected to the first treatment zone via a passage opening for the objects and in which the atmosphere is lean of treatment gas and oxygen, a circulation for the process gas with which a ventilator suctions process gas from the first treatment zone and sends it via a filter device which holds back the treatment gas, a first sluice which is allocated to the entry opening and which is flowed upon by the purified process gas coming from the filter device, a second sluice in the second treatment zone, which is allocated to the passage opening and which likewise is flowed upon by purified process gas, a third sluice which is allocated to the exit opening and which is connected to a source for inert gas under pressure and with an outgoing air branch for process gas, which in the conveying direction of the objects lies in front of the process air supply, connected to the first sluice.

2. An installation according to claim 1, wherein the filter device operates as an adsorber.

3. An installation according to claim 1, wherein the filter device is part of a purification circuit for the purpose of recovery of the treatment gas, preferably in liquid form.

4. An installation according to claim 3, wherein the purification circuit contains a condensation circuit.

5. An installation according to claim 4, wherein as inert gas liquid nitrogen is used which is stored in a reservoir and that the gas in the condensation circuit is cooled by way of a first cooler with liquid nitrogen.

6. An installation according to claim 5, wherein the condensation circuit comprises a first condensate collector, there is provided a refrigerating circuit consisting of a condensate container, of a pump connected to the condensate container and of a second cooler cooled with liquid nitrogen and of a second collector cooled with condensate coolant.

7. An installation according to claim 6, wherein the condensate container is divided into two sections by a weir and only one section is connected to the pump, whilst the first section is connected to the first collector.

8. An installation according to claim 1, wherein there is provided a control device for the supply of inert gas which is controlled in dependence on the oxygen concentration in the second zone.

9. An installation according to claim 8, wherein a first supply of inert gas to the control device is effected via the condensation circuit and a second supply via an air evaporator.

10. An installation according to claim 1, wherein two separate filter units are provided, which are alternately connectable to the first treatment zone (18) and to the purification device.

11. An installation according to claim 1, wherein the first treatment zone is connected to a blowing-off branch containing a valve for blowing of the process gas from the first treatment zone into the atmosphere when the oxygen concentration has reached a critical value.

12. An installation according to claim 11, wherein in the blowing-off branch there is arranged a transvector system with the inert gas as a propulsion jet.

13. An installation according to claim 1, characterised by the application to the treatment of glass containers with a polymer.

14. An installation according to claim 13, wherein the oxygen concentration in the second treatment zone is smaller than 3% by volume.

15. An installation according to claim 13, wherein in the second treatment zone there is arranged a UV irradiation source.

16. An installation according to claim 2, wherein the absorber contains zeolites, active carbon, molecular sieves or hydrophilic adsorbents.

* * * * *